Patented May 4, 1937

2,079,411

UNITED STATES PATENT OFFICE 2,079,411

WELDING OR FILLER ROD

Herbert C. Jennison, Bridgeport, Conn., assignor to The American Brass Company, Waterbury, Conn., a corporation of Connecticut No Drawing. Original application September 21, 1931, Serial No. 564,139. Divided and this application June 10, 1936, Serial No. 84,458

4 Claims. (Cl. 75—155)

This invention relates to a welding or filler rod for welding various metals, and also for autogenous welding of worked members of substantially the same alloy to produce an improved fabricated structure.

This application is a division of my prior application Serial No. 564,139 filed September 21, 1931.

It is an object of the invention to produce a new and improved welding or filler rod which will have superior welding properties, and will make a strong, dense, homogeneous and superior weld.

It is also an object to provide an improved welding rod which welds easily, provides a good union with the base metal, and does not choke the men during the welding operation.

A further object is to provide a welding rod of metal which can be readily worked and will thus produce a more ductile weld.

I have found that by the addition of from 0.01% to 5% manganese to a copper-zinc alloy containing from about 50% to about 70% copper to produce a copper, zinc, manganese alloy the welding properties are tremendously increased, that the welds can be easily made, are dense and homogeneous, and where it is used for welding base members of substantially the same composition when ground off and polished the weld is practically indistinguishable from the remainder of the base metal. Also that in the latter case the strength of the weld is practically the same as the base metal of the elements welded.

This alloy can be readily worked and hot rolled, extruded or drawn into the desired shape, and can also be cold rolled and drawn. It therefore makes a more ductile weld.

The preferred welding rod is composed of an alloy comprising in the neighborhood of 57.5 percent copper, 42 percent zinc and 0.5 percent manganese, and although a welding rod composed of an alloy having about the above noted proportions has proven very satisfactory as having improved properties for welding, I am not limited thereto, as the proportions of the various metals may be varied considerably without losing this adaptability for welding. The amount of manganese is preferably below 1.0 percent, and from 0.10 percent up to about 1.0 percent. However, as indicated above the copper may vary from about 50 percent to about 70 percent, the manganese from about 0.01 percent to about 5 percent and the balance zinc, although with the higher percentages of manganese the alloy may not work quite as readily in the mill.

It has been found that the manganese reduces the porosity of the metal in the weld and increases its strength, giving strong, dense welds. The manganese reduces the volatilization of the zinc during the welding operation, but in particular it improves the welding properties and flowing properties over the brass without the manganese, and it also materially increases the strength of the welded joint. In short this rod welds easily and makes a strong, dense and homogeneous weld. It can be used in supplying additional metal in welding whether the welding is done with a gas or blow torch, by electric arc, or other source of heat. It makes a very satisfactory rod for welding iron, steel and cast iron as well as for welding copper and copper alloys having suitable melting points.

Small amounts of other elements may be added so long as they do not materially change the welding properties and other improved characteristics of this material, and thus its adaptability for the purpose intended.

Having thus set forth the nature of my invention, what I claim is:

1. A welding or filler rod composed of a worked alloy comprising from 50% to 70% copper, from 0.01% to 5% manganese and balance zinc.

2. A welding or filler rod composed of a worked allow comprising from 50% to 70% copper, from 0.10% to 1.00% manganese, and balance zinc.

3. A welding or filler rod composed of a worked alloy comprising approximately 57.50% copper, 42% zinc, and 0.50% manganese.

4. A welding or filler rod composed of a worked alloy comprising approximately 41.50% to 43.50% zinc, 0.40% to 0.75% manganese and balance copper.

HERBERT C. JENNISON.